(12) United States Patent
Hamachi

(10) Patent No.: US 10,225,079 B2
(45) Date of Patent: Mar. 5, 2019

(54) COMMUNICATION APPARATUS, CONTROL METHOD, AND STORAGE MEDIUM

(71) Applicant: CANON KABUSHIKI KAISHA, Tokyo (JP)

(72) Inventor: Toshifumi Hamachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 107 days.

(21) Appl. No.: 15/379,149

(22) Filed: Dec. 14, 2016

(65) Prior Publication Data

US 2017/0180121 A1 Jun. 22, 2017

(30) Foreign Application Priority Data

Dec. 18, 2015 (JP) .................................. 2015-246898

(51) Int. Cl.
| | |
|---|---|
| *H04L 9/32* | (2006.01) |
| *H04L 9/08* | (2006.01) |
| *H04L 29/06* | (2006.01) |
| *H04W 12/04* | (2009.01) |
| *H04W 12/06* | (2009.01) |
| *H04W 48/08* | (2009.01) |
| *H04W 84/12* | (2009.01) |
| *H04W 88/04* | (2009.01) |
| *H04W 88/08* | (2009.01) |

(52) U.S. Cl.
CPC ............ *H04L 9/0822* (2013.01); *H04L 63/06* (2013.01); *H04L 63/083* (2013.01); *H04L 63/20* (2013.01); *H04W 12/04* (2013.01); *H04W 12/06* (2013.01); *H04W 48/08* (2013.01); *H04W 84/12* (2013.01); *H04W 88/04* (2013.01); *H04W 88/08* (2013.01)

(58) Field of Classification Search
CPC ........... G06K 9/00013; G06K 9/00087; G06K 9/00288; G06K 9/00617; H04N 1/00127; H04N 1/00244; H04N 1/00307; H04N 1/00326; H04N 1/00334; H04N 2201/0082; H04W 12/04; H04W 12/06; H04W 48/08; H04W 84/12; H04W 88/04; H04W 88/08; H04L 63/06; H04L 63/083; H04L 63/20; H04L 9/0822
See application file for complete search history.

(56) References Cited

U.S. PATENT DOCUMENTS

| | | | | |
|---|---|---|---|---|
| 2002/0061748 | A1* | 5/2002 | Nakakita | H04L 63/08 455/435.1 |
| 2012/0082103 | A1* | 4/2012 | Lin | H04W 74/085 370/329 |
| 2013/0176956 | A1* | 7/2013 | Yamamoto | H04W 76/11 370/329 |

* cited by examiner

*Primary Examiner* — Abiy Getachew
(74) *Attorney, Agent, or Firm* — Canon U.S.A., Inc. IP Division

(57) ABSTRACT

A communication apparatus includes a receiving unit that receives, from a first base station via wireless communication, a first communication parameter including an identifier and first security information about a first wireless network configured by the first base station, and a transmitting unit that transmits, via wireless communication, a communication parameter including the identifier to a second base station.

18 Claims, 6 Drawing Sheets

COMMUNICATION APPARATUS, CONTROL METHOD, AND STORAGE MEDIUM

BACKGROUND

Field of the Invention

The present disclosure relates to a communication apparatus for communicating with a base station.

Description of the Related Art

To connect with a wireless network, it is necessary to set communication parameters such as an identifier, an encryption method, an authentication method, an encryption key, or an authentication key of the wireless network before connection processing is performed. However, manually setting the communication parameters requires complicated operations. United States Patent Publication Application No. 2002/0061748 discusses a configuration in which an apparatus can easily connect with a wireless network by receiving communication parameters from a base station configuring the wireless network and setting them in the apparatus itself.

In a case where an existing base station is replaced with a new base station, there is a demand that the new base station can configure a wireless network having the same identifier as that of the existing base station. This is because a user can easily recognize a wireless network to connect with when an identifier familiar to the user is used.

SUMMARY

To address the above-described issue, embodiments of the invention generally relate to a technique enabling a second base station to easily configure another wireless network having the identifier of a wireless network configured by a first base station.

According to an aspect of the present invention, a communication apparatus includes, a receiving unit configured to receive, via wireless communication, a first communication parameter including an identifier and first security information about a first wireless network configured by a first base station, from the first base station, and a transmitting unit configured to transmit, via wireless communication, a communication parameter including the identifier to a second base station.

Further features will become apparent from the following description of exemplary embodiments with reference to the attached drawings.

DESCRIPTION OF THE EMBODIMENTS

An exemplary embodiment will be described in detail below with reference to the accompanying drawings. A description is provided of an example using a wireless local area network (LAN) system conforming to the Institute of Electrical and Electronics Engineers, Inc. (IEEE) 802.11 series standard (hereinafter referred to as 802.11 standard). However, the configuration is not limited thereto. The present exemplary embodiment is also applicable to a wireless LAN system conforming to other wireless communication methods, such as Bluetooth® and ZigBee.

Figure 1:
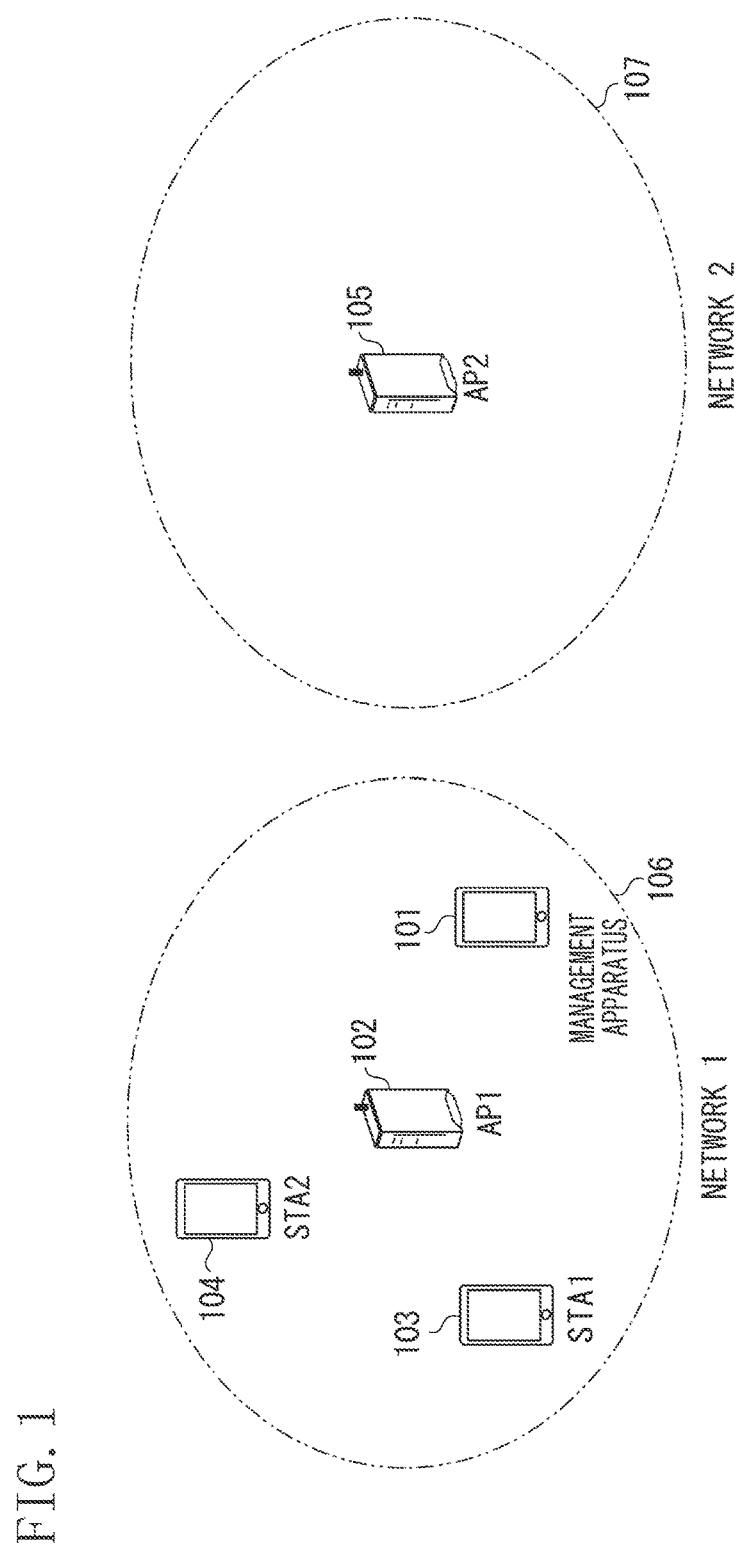
FIG. 1 illustrates a configuration of a wireless network.

FIG. 1 illustrates a network system including a management apparatus 101, a first access point 102 (hereinafter referred to as an AP1), a station 103 (hereinafter referred to as an STA1), a station 104 (hereinafter referred to as an STA2), and a second access point 105 (hereinafter referred to as an AP2).

The AP1 is an access point of the Infrastructure mode defined by the 802.11 standard, and configures a wireless network 106 (hereinafter referred to as a network 1). The AP1 can configure the wireless network 106 (hereinafter referred to as a network 1) as a Group Owner defined by the Wi-Fi Direct® standard. In other words, the AP1 operates as a base station.

The management apparatus 101, the STA1, and the STA2 operate as stations (terminal apparatuses) to be connected to the network 1. The AP2 operates as a base station and configures a wireless network 107 (hereinafter referred to as a network 2).

Figure 2:
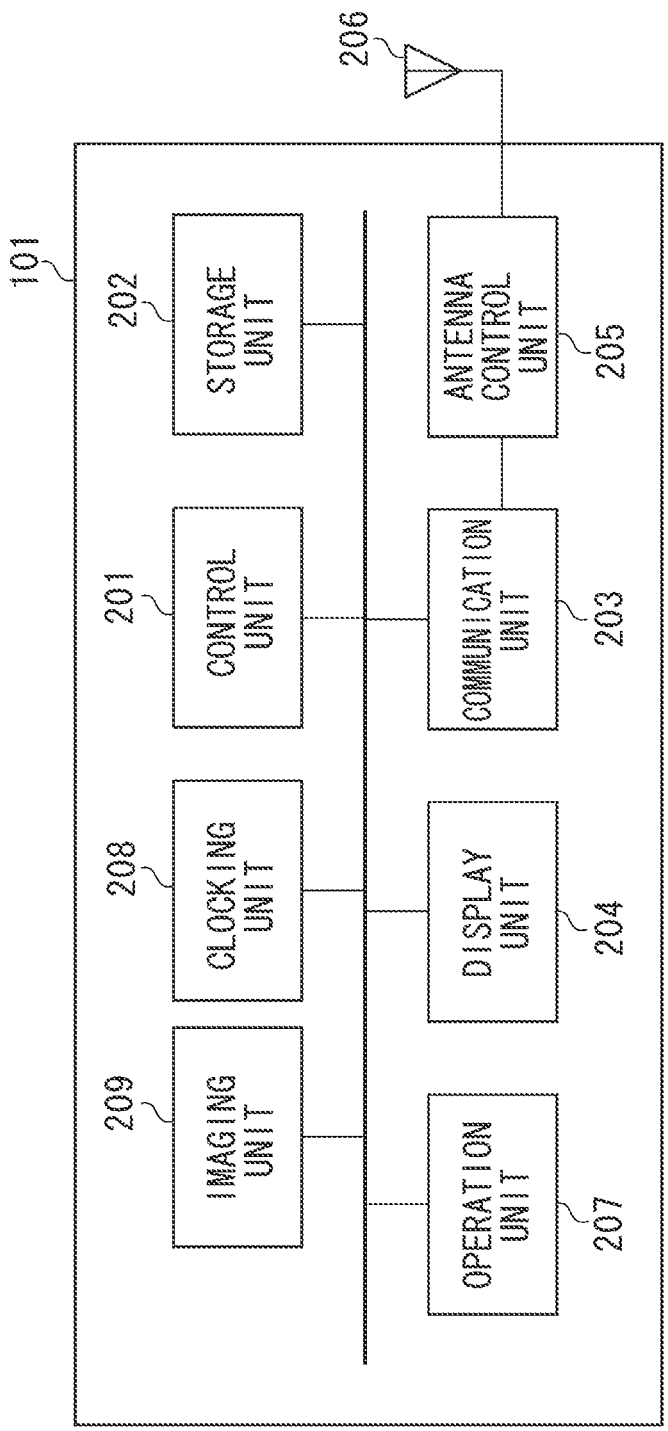
FIG. 2 illustrates a hardware configuration of a management apparatus.

FIG. 2 illustrates a hardware configuration of the management apparatus 101 according to the present exemplary embodiment. The AP1, the AP2, the STA1, and the STA2 have similar hardware configurations. However, the hardware configurations are not limited thereto. The AP1, the AP2, the STA1, and the STA2 may not include a part (for example, an imaging unit 209) of the hardware configuration illustrated in FIG. 2.

A control unit 201 includes a central processing unit (CPU) or microprocessor unit (MPU), and controls the entire management apparatus 101 by executing a program stored in a storage unit 202. The control unit 201 also performs communication parameter setting processing with another communication apparatus. The control unit 201 can control the entire management apparatus 101 while working with an operating system (OS) executed by the control unit 201.

The storage unit 202 includes a read only memory (ROM) and a random access memory (RAM) and stores various kinds of information such as programs for performing various operations (described below) and communication parameters (or a parameter) for wireless communication. As parameters for connecting with a wireless network, the communication parameters include an identifier (for example, service set identifier (SSID)) and security information about the wireless network. The security information includes an encryption method, an encryption key, an authentication method, and an authentication key. The communication parameters can include any one of the above-described parameters.

The storage unit 202 can be a memory such as a ROM and a RAM, or a storage medium such as a flexible disk, a hard disk, an optical disc, a magneto-optical disc, a compact disc read only memory (CD-ROM), a compact disc recordable (CD-R), a magnetic tape, a nonvolatile memory card, or a digital versatile disc (DVD).

A communication unit 203 performs wireless communication conforming to the IEEE 802.11 series. The communication unit 203 can include a short-distance wireless communication function conforming to Near Flied Communication (NFC). A display unit 204 outputs visually recognizable information such as a liquid crystal display (LCD) or light emitting diode (LED). The display unit 204 displays a Quick Response code (QR Code®) which includes information required for communication parameter setting processing. Instead of or in addition to visually recognizable information, the display unit 204 can output orally recognizable information, such as speaker sound.

An antenna control unit 205 controls an antenna 206. An operation unit 207 is used by a user to input various kinds of information to operate a communication apparatus. A clocking unit 208 detects the progress of time. The imaging unit 209 captures an image. The management apparatus 101 analyzes, via the control unit 201, an image input from the imaging unit 209 to acquire authentication information. The authentication information includes information about a public key, a certificate, or a password used when the communication parameters are shared with the other communication apparatus.

Figure 3:
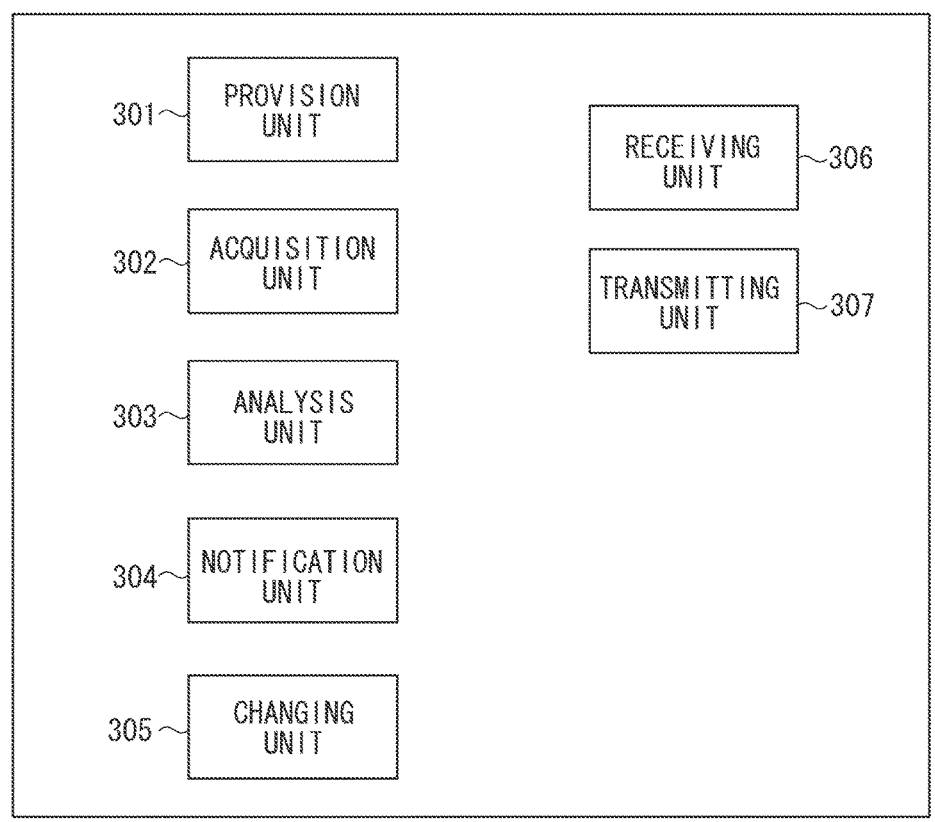
FIG. 3 illustrates software function blocks of the management apparatus.

FIG. 3 illustrates software function blocks implemented when the control unit 201 of the management apparatus 101 reads and executes a program stored in the storage unit 202. At least a part of the software function blocks illustrated in FIG. 3 can be implemented by hardware.

When a software function block is implemented by hardware, it is only necessary, for example, to generate a dedicated communication circuit on a Field Programmable Gate Array (FPGA) based on a program for implementing each function block by using a predetermined compiler and use this circuit as hardware having the function of the software module. The software function blocks can be implemented as hardware by forming a Gate Array circuit in a similar way to the FPGA.

A provision unit 301 provides the other communication apparatus with the communication parameters. An acquisition unit 302 acquires the communication parameters from the other communication apparatus. The acquisition unit 302 may be constructed as a plurality of acquisition units. The management apparatus 101 can perform relay processing for providing, via the provision unit 301, one communication apparatus with the communication parameters acquired, via the acquisition unit 302, from a first other communication apparatus.

An analysis unit 303 analyzes an image captured by the imaging unit 209 to extract the authentication information and the identifier of the other communication apparatus to be used for communication parameter sharing processing. The identifier of the other communication apparatus is a Media Access Control (MAC) address that is an identifier specific to the other communication apparatus. Instead of the MAC Address, the identifier of the other communication apparatus can be a Universally Unique Identifier (UUID).

The analysis unit 303 analyzes a captured QR Code® to extract the authentication information and the identifier. Instead of using the QR Code®, another two-dimensional code, such as a Communication PlatForm Code (CP code) or a one-dimensional bar code, can be used.

Instead of analyzing an image captured by the imaging unit 209, the analysis unit 303 can acquire the authentication information and the identifier via wireless communication such as NFC, Bluetooth®, ZigBee, IEEE 802.11ad, or TransferJet®.

A notification unit 304 notifies the other communication apparatus of changes of the communication parameters. The notification unit 304 also transmits the changed communication parameters to the other communication apparatus.

A changing unit 305 changes part or all of the communication parameters acquired from the other communication apparatus. The changing unit 305, based on the function information of the other communication apparatus, determines parameters to be changed out of parameters included in the communication parameters.

A receiving unit 306 receives a packet, and a transmitting unit 307 transmits a packet. In this manner, the management apparatus 101 performs wireless communication conforming to the 802.11 standard with the other communication apparatus.

Figure 4:
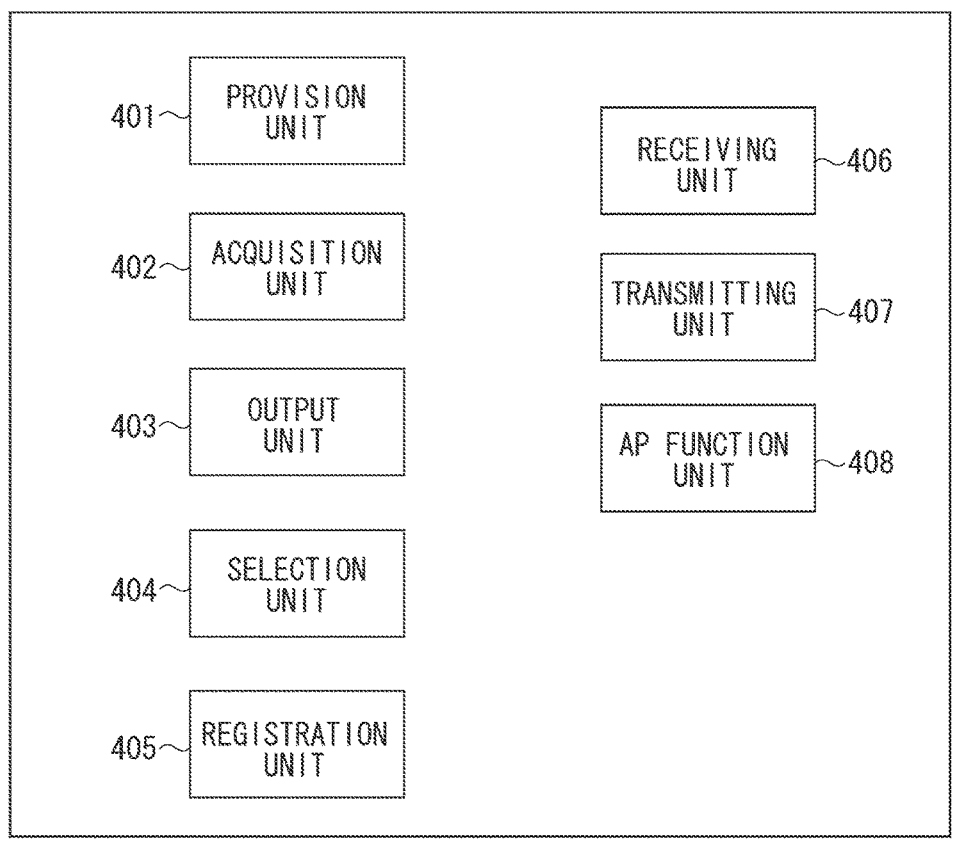
FIG. 4 illustrates software function blocks of a base station.

FIG. 4 illustrates software function blocks implemented when the control unit 201 of the AP1 reads and executes a program stored in the storage unit 202. As described above, at least a part of the software function blocks illustrated in FIG. 4 can be implemented by hardware. The AP2 has similar software function blocks to those of the AP1.

A provision unit 401 provides another communication apparatus with the communication parameters. An acquisition unit 402 acquires the communication parameters from the management apparatus 101. The acquisition unit 402 also acquires the authentication information from the management apparatus 101.

An output unit 403 generates a QR Code® including the authentication information to be used for communication parameter sharing processing and the identifier information about the AP1 and outputs the QR Code® to the display unit 204. Instead of using the QR Code®, another two-dimensional code, such as the CP code or a one-dimensional bar code, can be used.

Instead of outputting the QR Code®, the output unit 403 can output the authentication information and the identifier via wireless communication such as NFC, Bluetooth®, ZigBee, IEEE 802.11ad, and TransferJet®.

A selection unit 404 selects the communication parameters (or a parameter) to be provided to the other communication apparatus in a case where a plurality of communication parameters exists. A registration unit 405 performs processing of registering or deleting information about a management apparatus. An AP function unit 408 performs control required for the AP1 to operate as a base station. The AP function unit 408 configures a wireless network connectable using the communication parameters acquired from the management apparatus 101. The AP function unit 408 also performs the maintenance and management of the wireless network. A receiving unit 406 receives a packet, and a transmitting unit 407 transmits a packet. In this manner, the AP1 performs wireless communication conforming to the 802.11 standard with the other communication apparatus.

All the function blocks have correlations on a software or hardware basis. The above-described function blocks are to be considered as an example. A plurality of function blocks can configure one function block, and any one function block can be divided into a plurality of function blocks.

The management apparatus 101, according to the present exemplary embodiment, reads the QR Code® of the AP2 to acquire the authentication information of the AP2. The management apparatus 101 performs authentication processing with the AP2 by using the authentication information to acquire a management authority for setting the communication parameters of a wireless network to be configured by the AP2. The management apparatus 101 connects with a network 2 by using the communication parameters.

The management apparatus 101 reads the QR Code® of the STA1 to acquire the STA1's authentication information. Then, the management apparatus 101 transmits the acquired authentication information about the STA1 to the AP2. The AP2 that receives the authentication information performs communication parameter sharing processing with the STA1. Through the communication parameter sharing processing, the STA1 acquires the communication parameters for connecting with the network 2, and connects with the network 2.

Figure 5:
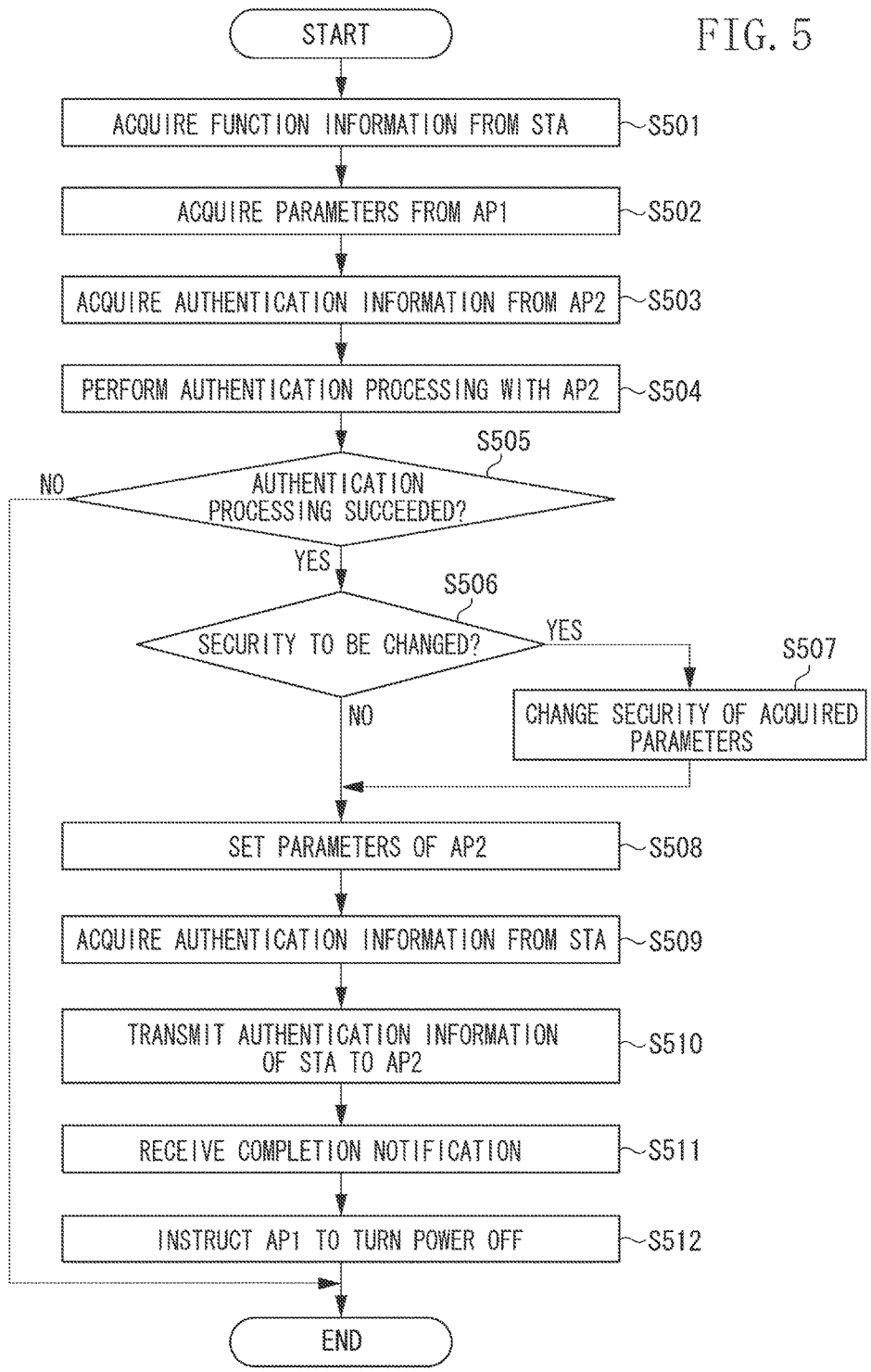
FIG. 5 is a flowchart illustrating processing by the management apparatus.

An example of replacing an existing base station (AP1) with a new base station (AP2) will be described in detail below. FIG. 5 is a flowchart illustrating processing implemented when the control unit 201 reads and executes a program stored in the storage unit 202 of the management apparatus 101 in a case where a predetermined instruction is issued from a user.

At least a part of the processing in the flowchart illustrated in FIG. 5 can be implemented by hardware. In a case where the processing is implemented by hardware, it is only necessary, for example, to automatically generate a dedicated communication circuit on an FPGA based on a program for implementing each step by using a predetermined compiler. The processing can also be implemented by forming a Gate Array circuit in a way similar to the FPGA. The processing can also be implemented by an Application Specific Integrated Circuit (ASIC).

Figure 6:
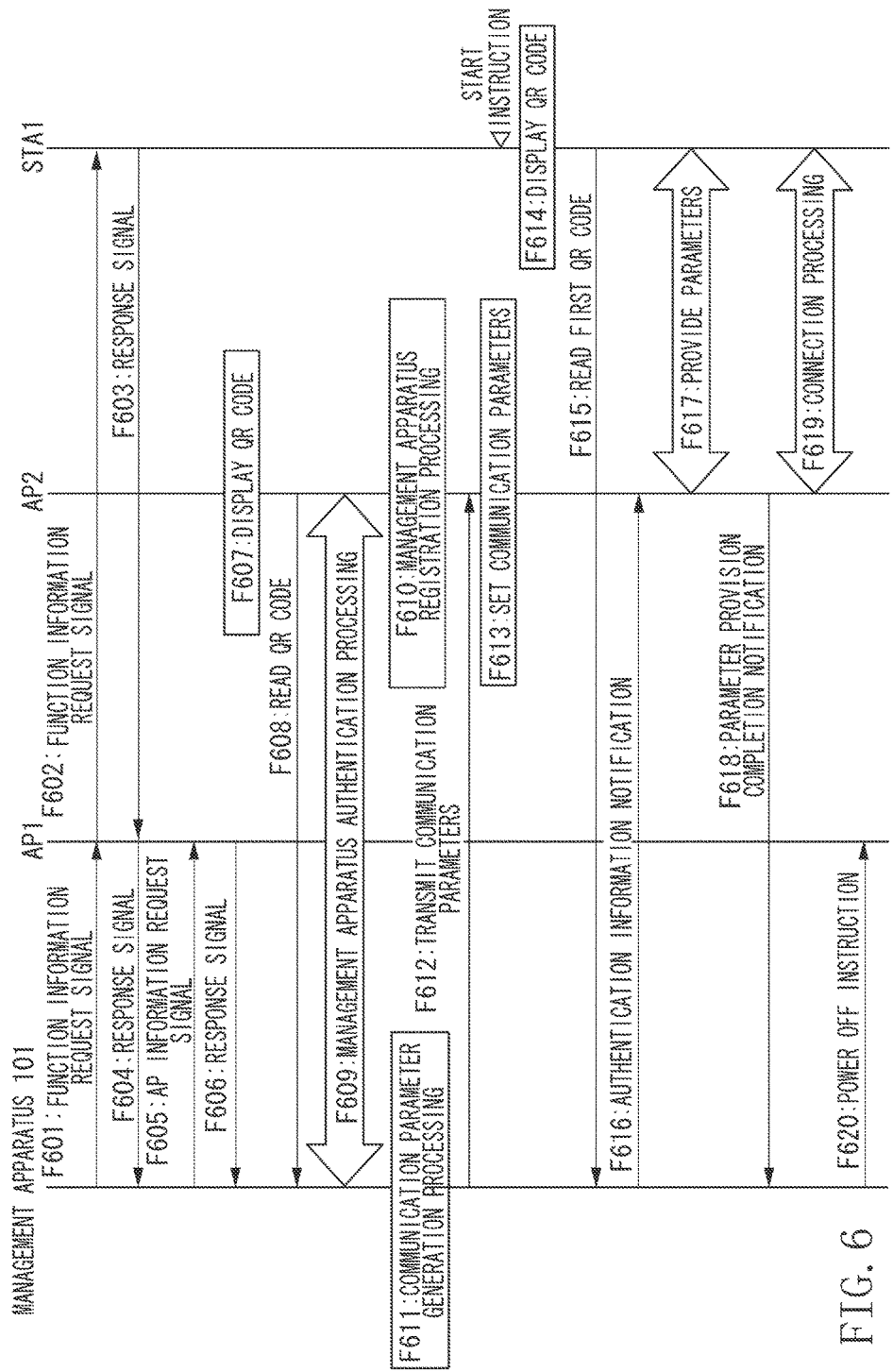
FIG. 6 is a sequence diagram.

FIG. 6 is a sequence diagram illustrating processing between the management apparatus 101, the AP1, the AP2, and the STA1. In the initial state, the AP1 has configured the network 1, and the management apparatus 101 and the STA1 have connected with the network 1.

In step S501, the management apparatus 101 acquires the function information related to security of the STA1. In steps F601 and F602, the management apparatus 101 transmits, in a unicast manner, a function information request signal to the STA1 via the AP1. The function information request signal is a packet conforming to Universal Plug and Play (UPnP) or Bonjour.

Instead of unicast transmission, the management apparatus 101 can perform multicast or broadcast transmission. Multicast or broadcast transmission enables the management apparatus 101 to receive a response from a plurality of apparatuses by using one request signal.

In steps F603 and F604, the STA1 that has received the function information request signal transmits a response signal including the function information about the STA1 to the management apparatus 101 via the AP1. More specifically, the response signal includes encryption function information indicating whether the STA1 supports Advanced Encryption Standard (AES) or Temporal Key Integrity Protocol (TKIP) as an encryption method.

AES provides stronger encryption than TKIP. The response signal also includes authentication function information indicating whether the STA1 supports Wi-Fi Protected Access® as an authentication method. WPA2™ provides stronger authentication than WPA™.

Instead of the above-described information, the response signal can include version information about the STA1 as function information. In such a case, the encryption method and the authentication method corresponding to the version information are predetermined.

The management apparatus 101 receives a response signal from the STA1 to acquire the function information related to security of the STA1.

The response signal can include such information as a communication method (IEEE 802.11ac, etc.) supported by the STA1 and a frequency band (2.4 GHz or 5 GHz) usable by the STA1.

In step S502, the management apparatus 101 acquires the communication parameters including the identifier (SSID in this example) of the wireless network 1 from the AP1. In step F605, the management apparatus 101 transmits an AP information request signal to the AP1. When the request signal has been received, in step F606, the AP1 transmits a response signal including communication parameter information for connecting with the network 1 to the management apparatus 101. The management apparatus 101 receives the response signal to acquire the communication parameters from the AP1. Instead of the response signal reception, the management apparatus 101 can acquire the communication parameters from the AP1 through data communication such as Hypertext Transfer Protocol (HTTP).

In step F607, in response to a user operation, the AP2 displays on the display unit of the AP2 a QR Code® including the authentication information and the public key information about the AP2. Instead of being displayed, the QR Code® can be located on a seal that is affixed to the housing of the AP2. The QR Code® can also be affixed to or located in/on an accessory of the AP2, such as an operation manual or a packing material (corrugated paper, etc.) the AP2 was shipped/sold in. The QR Code® can be provided as part of the AP2 itself or as part of an accessory itself.

In steps S503 and F608, the management apparatus 101 reads the QR Code® of the AP2 via the imaging unit 209 to acquire the authentication information and the public key information about the AP2. In steps S504 and F609, the management apparatus 101 performs authentication processing, based on the acquired authentication information, for acquiring a management authority from the AP2. In the authentication processing, the management apparatus 101 acquires the function information about the AP2.

In a case where the management apparatus 101 succeeds in the authentication processing (YES in step S505), in step F610, the AP2 registers the management apparatus 101 as an apparatus having a management authority. Then in step F611, the management apparatus 101 starts processing for generating the communication parameters to be set to the AP2.

In a case where the management apparatus 101 fails in the authentication processing (NO in step S505), the management apparatus 101 ends the processing illustrated in FIG. 5. In such a case, the management apparatus 101 can notify the user of an error.

The communication parameter generation processing in step F611 will be described below.

In step S506, the management apparatus 101 determines whether the security method, i.e., a combination of the authentication method and the encryption method, for the communication parameters acquired from the AP1 is to be changed to a scheme providing a stronger security. In the present exemplary embodiment, the management apparatus 101 determines whether to change the security method based on the function information about the STA1 and AP2 and the security method for the communication parameters.

For example, in a case where the security method for the communication parameters is WPA-TKIP and the STA1 and AP2 support WPA2-AES, the management apparatus 101 determines that the security method for the communication parameters is to be changed to WPA2-AES. In a case where at least the STA1 or the AP2 do not support WPA2-AES, the management apparatus 101 determines that the security method for the communication parameters is not to be changed.

The management apparatus 101 can make the determination without taking the function information about the STA1 into consideration. In such a case, the management apparatus 101 does not need to acquire the function information about the STA1.

For example, when the security method for the communication parameters is WPA2-AES and security cannot be improved by changing the security method, the management apparatus 101 determines that the security method for the communication parameters is not to be changed.

In a case where the management apparatus 101 determines that the security method is to be changed (YES in step S506), then in step S507, the management apparatus 101 changes the security method for the communication parameters and generates new communication parameters. In the present exemplary embodiment, the management apparatus 101 changes the encryption method from TKIP to AES and changes the authentication method from WPA to WPA2. In a case where an encryption key having the same length (key length) is usable for TKIP and AES, the management apparatus 101 does not change the encryption key. In a case where an encryption key having the same length (key length) is not usable for TKIP and AES, the management apparatus 101 generates a new encryption key.

Similarly, when an authentication key having the same length (key length) is usable for WPA and WPA2, the management apparatus 101 does not change the authentication key. On the other hand, when an encryption key having the same length (key length) is not usable for TKIP and AES, the management apparatus 101 generates a new authentication key. In step S507, the management apparatus 101 does not change the identifier of the wireless network. In other words, the identifier information included in the communication parameters before being changed is identical to the identifier information included in the communication parameters after being changed.

The management apparatus 101 can change only either one of the encryption method or the authentication method.

When the security method has been changed in step S507, then in step S508, the management apparatus 101 performs setting processing for setting, to the AP2, the communication parameters having been changed. More specifically, in step F612, the management apparatus 101 encrypts the communication parameters having been changed, by using the public key acquired from the QR Code® of the AP2 and transmits the encrypted communication parameters to the AP2. This configuration improves the security in transmitting the communication parameters.

In the above-described exemplary embodiment, neither the encryption key nor the authentication key is to be changed according to the key length for the communication parameters before being changed and the key length for the communication parameters after being changed. With this configuration, terminals connected to the AP1 can connect to the AP2 without largely changing the settings thereof.

In a case where the management apparatus 101 determines that the security method is not to be changed (NO in step S506), then in step S508, the management apparatus 101 performs setting processing for setting the communication parameters acquired in step S502 to the AP2.

When the AP2 has received the communication parameters from the management apparatus 101, in step F613, the AP2 sets the received communication parameters as the communication parameters for a wireless network (network 2) to be configured by the AP2.

In this manner, since the security method of the AP2 has been changed from the security method of the AP1 to a scheme providing a stronger security, data communication with stronger security becomes possible.

When the communication parameters have been set to the AP2, the management apparatus 101 performs processing for setting the communication parameters to the STA1. This processing can be omitted when no communication parameter has been changed.

When the STA1 has received a user instruction for starting setting the communication parameters, in step F614, the STA1 displays the QR Code® including the authentication information about the STA1 on the display unit. Instead of receiving a user instruction, the STA1 can display the QR Code® in response to receiving a predetermined signal from the management apparatus 101. Instead of displaying the QR Code®, the STA1 can display another two-dimensional code or a one-dimensional bar code. Instead of displaying a code, the STA1 can transmit the authentication information via wireless communication such as NFC, Bluetooth®, ZigBee, IEEE 802.11ad, and TransferJet®.

In steps S509 and F615, the management apparatus 101 reads the QR Code® of the STA1 to acquire the authentication information including the public key information about the STA1. In a case where the STA1 displays a code other than the QR Code®, the management apparatus 101 only needs to read the code to acquire the authentication information. In a case where the STA1 transmits the authentication information via wireless communication instead of displaying the QR Code®, the management apparatus 101 only needs to receive the authentication information via corresponding wireless communication.

In step F616, the management apparatus 101 transmits the acquired authentication information about the STA1 to the AP2, which triggers, in step S510, the STA1 and AP2 to start the communication parameter sharing processing. Then, in step S511, the management apparatus 101 waits for a completion notification indicating that the STA1 and AP2 have completed the communication parameter sharing processing.

In step F617, the AP2 performs the communication parameter share processing with the STA1 by using the authentication information about the STA1 received from the management apparatus 101, and provides the STA1 with the communication parameters. The AP2 also encrypts the communication parameters based on the public key of the STA1 included in the authentication information and transmits the encrypted communication parameters to the STA1, improving the security in sharing the communication parameters.

As described above, in step F619, the STA1 that receives the communication parameters connects with the AP2 and data communication becomes ready. Since the security method of the AP2 has been changed from the security method of the AP1 to a scheme providing stronger security, data communication with stronger security becomes possible.

When the AP2 has completed processing for providing the STA1 with the communication parameters, then in step F618, the AP2 transmits to the management apparatus 101 a completion notification signal including information indicating the completion of the communication parameter provision processing.

When the completion notification signal has been received, in step F620, the management apparatus 101 instructs the AP1 to turn OFF power of the AP1, and the power of the AP1 is turned off. With this configuration, the wireless network 1 configured by the AP1 can be terminated. Instead of issuing the turn OFF instruction, the management apparatus 101 can display, on the display unit 204, an instruction for the user to turn OFF the power of the AP1.

Instead of turning the power OFF, the management apparatus 101 can instruct the AP1 to change the communication parameters. Terminating the wireless network 1 or changing the communication parameters by the AP1 in this way can prevent the STA1 or the like from connecting with the wireless network 1 of a previous AP1.

As described above, according to the present exemplary embodiment, when the AP1 is replaced with the AP2, the AP2 is able to easily configure the wireless network 2 having the identifier of the wireless network 1 configured by the AP1.

Since the security method for the communication parameters is automatically changed to a scheme providing a stronger security, security and user convenience are improved. Since a security method is selected within a range of the capabilities of the APs and STAs, connectivity degradation due to a change of the security method can be prevented.

In the above-described exemplary embodiment, in a case where the AP2 does not support a predetermined security method (e.g., AES), the management apparatus 101 can abnormally end the processing illustrated in FIG. 5. This configuration can reduce the possibility that a new wireless network having low security is configured.

According to the above-described exemplary embodiment, in steps S510 and F616, the management apparatus 101 transmits the authentication information about the STA1 to the AP2. Then in step F617, the AP2 provides the STA1 with the communication parameters. Alternatively, the management apparatus 101 can directly provide the STA1 with the communication parameters. In such a case, the management apparatus 101 encrypts the communication parameters using the public key of the STA1 included in the authentication information about the STA1 and transmits the encrypted communication parameters to the STA1. For example, the management apparatus 101 can transmit the communication parameters using an Extensible Authentication Protocol (EAP) packet. Further, for example, the management apparatus 101 can transmit the communication parameters using an Action frame conforming to the 802.11 standard. In this manner, the security in sharing the communication parameters can be improved.

In the above-described exemplary embodiment, in the initial state, the AP1 has configured the network 1, and the management apparatus 101 and the STA1 are in connection with the network 1. However, the initial condition is not limited thereto. It is applicable that either one or both of the management apparatus 101 and the STA1 have not connected with the network 1.

In such a case, in step S501, the management apparatus 101 acquires the function information about the STA1 by using an EAP packet. The use of an EAP packet enables the management apparatus 101 to acquire the function information about the STA1 even if the management apparatus 101 and the STA1 are not participating in the same wireless network.

In step S502, the management apparatus 101 acquires the communication parameters from the AP1 by using the Wi-Fi® Protected Setup (WPS) standard with the AP1. In step S503 and subsequent steps, the management apparatus 101 performs operations similar to the above-described operations and obtains similar effects.

In the above-described exemplary embodiment, the management apparatus 101 sets, to the AP2, the changed communication parameters. However, when the AP2 is able to concurrently configure a plurality of networks in parallel, the management apparatus 101 can set both the communication parameters before being changed and the communication parameters after being changed to the AP2. The management apparatus 101 can determine whether the AP2 can concurrently configure a plurality of networks in parallel. More specifically, the AP2 transmits a response signal for the function information request signal in step F601, and the management apparatus 101 receives this signal. Alternatively, the AP2 displays a QR Code® including the function information, and the management apparatus 101 captures an image of the QR Code®, so that the management apparatus 101 can make the determination.

Since the AP2 is able to configure a wireless network equivalent to the network 1 in this manner, connectivity can be improved. If an STA to be connected to one of the wireless networks does not exist for a predetermined time period, the AP2 can terminate the wireless network. This configuration can reduce the degradation of security.

Embodiments can also be achieved when a program for implementing at least one of the above-described functions is supplied to a system or apparatus via a network or storage medium, and at least one processor in a computer of the system or apparatus reads and executes the program. Further, embodiments can also be achieved by a circuit for implementing at least one function, e.g., an application specific integrated circuit (ASIC).

According to the above-described embodiment, a second base station can easily configure another wireless network having the identifier of a wireless network configured by a first base station.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-246898, filed Dec. 18, 2015, which is hereby incorporated by reference herein in its entirety.

What is claimed is:

1. A communication apparatus comprising:
one or more processors; and
one or more memories including instructions that, when executed by the one or more processors, cause the apparatus to:
receive, via wireless communication, a first communication parameter including an identifier and first security information about a first wireless network configured by a first base station, from the first base station;
generate a second communication parameter including second security information in which a security method defined in the first security information is changed to another security method providing stronger security; and
transmit, via wireless communication, the second communication parameter including the identifier to a second base station in order to enable the second base station to configure a second wireless network in which stronger security than that of the first wireless network is provided and in which the identifier about the first wireless network is used.

2. The communication apparatus according to claim 1, wherein the communication apparatus acquires information about an encryption key of the second base station, and
wherein the communication apparatus encrypts the second communication parameter based on the acquired information about the encryption key and transmits the encrypted second communication parameter to the second base station.

3. The communication apparatus according to claim 2, wherein the communication apparatus acquires the information about the encryption key by reading a one-dimensional or two-dimensional code.

4. The communication apparatus according to claim 1, wherein the communication apparatus acquires first function information indicating a function of the second base station,
wherein, based on the acquired first function information, the communication apparatus generates the second communication parameter.

5. The communication apparatus according to claim 4, wherein the communication apparatus generates the second communication parameter based on the first function information and the first security information.

6. The communication apparatus according to claim 4, wherein the communication apparatus acquires second function information indicating a function of another communication apparatus to be connected to the first wireless network, and
wherein, based on the first and the second function information, the communication apparatus generates the second communication parameter including the second security information.

7. The communication apparatus according to claim 4, wherein the communication apparatus acquires second function information indicating a function of another communication apparatus to be connected to the first wireless network, and
wherein, according to a function of the communication apparatus and the first and the second function information, the communication apparatus generates the second communication parameter including the second security information.

8. The communication apparatus according to claim 1, wherein the communication apparatus provides notification of the second communication parameter.

9. The communication apparatus according to claim 1, wherein, in addition to the second communication parameter, the communication apparatus transmits the first communication parameter to the second base station.

10. The communication apparatus according to claim 1, wherein the communication apparatus generates the second communication parameter including the second security information in which an encryption strength defined in the first security information is increased.

11. The communication apparatus according to claim 1, wherein the communication apparatus generates the second communication parameter including the second security information in which an authentication strength defined in the first security information is increased.

12. The communication apparatus according to claim 1, wherein the first security information includes at least an encryption method, an authentication method, an encryption key, or an authentication key.

13. The communication apparatus according to claim 1, wherein the first wireless network is a network for performing wireless communication conforming to IEEE 802.11 series standard.

14. The communication apparatus according to claim 1, wherein the communication apparatus instructs that a wireless network of the first base station be terminated in response to transmitting the communication parameter.

15. The communication apparatus according to claim 1, wherein the second base station is an access point in an infrastructure mode compliant with IEEE 802.11 series standard.

16. The communication apparatus according to claim 1, wherein the second base station is a Group Owner defined in Wi-Fi® Direct standard.

17. A method for controlling a communication apparatus, the method comprising:
receiving, via wireless communication, a first communication parameter including an identifier and security information about a first wireless network configured by a first base station, from the first base station;
generating a second communication parameter including second security information in which a security method defined in the first security information is changed to another security method providing stronger security; and
transmitting, via wireless communication, the second communication parameter including the identifier to a second base station in order to enable the second base station to configure a second wireless network in which stronger security than that of the first wireless network is provided and in which the identifier about the first wireless network is used.

18. A non-transitory computer-readable storage medium storing computer executable instructions that causes a computer to execute a method for controlling a communication apparatus, the method comprising:
receiving, via wireless communication, a first communication parameter including an identifier and first security information about a first wireless network configured by a first base station, from the first base station;
generating a second communication parameter including second security information in which a security method defined in the first security information is changed to another security method providing stronger security; and transmitting, via wireless communication, the second communication parameter including the identifier to a second base station in order to enable the second base station to configure a second wireless network in which stronger security than that of the first wireless network is provided and in which the identifier about the first wireless network is used.

\* \* \* \* \*